United States Patent [19]
Nakamura

[11] Patent Number: 5,577,870
[45] Date of Patent: Nov. 26, 1996

[54] TIGHTENING SCREW

[76] Inventor: Daijiro Nakamura, 662-2, Shimogishicho, Ono-shi, Hyogo, Japan

[21] Appl. No.: 31,311

[22] Filed: Mar. 15, 1993

[30] Foreign Application Priority Data

Aug. 31, 1992 [JP] Japan .................................... 4-257419

[51] Int. Cl.$^6$ .............................. F16B 31/00; F16B 37/08
[52] U.S. Cl. .................. 411/7; 411/402; 411/432
[58] Field of Search .................................. 411/6, 7, 402, 411/408, 432, 433

[56] References Cited

U.S. PATENT DOCUMENTS

| | | | |
|---|---|---|---|
| 3,425,314 | 2/1969 | Ohlson | 411/7 |
| 4,159,667 | 7/1979 | Nordstrom | 411/7 |
| 4,176,582 | 12/1979 | Witte | 411/7 |
| 4,687,392 | 8/1987 | Bidwell | 411/432 X |
| 4,955,744 | 9/1990 | Barth et al. | 411/432 X |
| 5,016,931 | 5/1991 | Jackson | 411/7 X |

*Primary Examiner*—Neill R. Wilson
*Attorney, Agent, or Firm*—Moonray Kojima

[57] ABSTRACT

The tightening screw of the invention comprises a screw member forming female threads or male threads in a shaft core part, a flange ring fitted to the outer periphery of the screw member to contact with the object to be tightened, an operating ring for feeding a rotational force by fitting oppositely to the flange ring on the outer periphery of the screw member, and a torque transmitting member interposed between the screw member and operating ring for transmitting the rotational force of the operating ring to the screw member, wherein the torque transmitting member comprises a rotation number reduction mechanism for transmitting the rotational force of the operating ring to the screw member by reducing the rotation number and thereby increase the transmitted torque, and a unidirectional torque limiter for cutting off transmission of torque in the tightening direction of the screw member to the object to be tightened at a specific load.

4 Claims, 14 Drawing Sheets

TIGHTENING SCREW

DETAILED DESCRIPTION OF THE INVENTION

1. Industrial Field of Utilization

The invention relates to a tightening screw to be used for tightening a rotary tool, such as the wheel of a hand grinder or the circular saw of a hand saw, to a mounting threaded part (for example, male threading) spirally provided on a drive shaft, and which is capable of being tightened with a small rotary input force and of being easily loosened.

2. Prior Art

To mount a rotary tool such as grinding wheel or circular saw on a driving shaft, hitherto, a flange and male threads were formed at the end portion of the driving shaft, and the rotary tool was fitted to the male thread part, and a tightening screw with female threads such as a nut was fitted on the outer part, and by tightening the nut, the rotary tool between the nut and the flange was fixed in place.

In the tightening and loosening operation, however, a tool such as wrench was generally used, and therefore sufficient force amplification was not obtained because only this tool was used for amplifying the force to tighten or loosen the nut.

Besides, in the use of such rotary tool, if the rotary tool is used in such a manner that a tightening force is transmitted to the nut, the nut may be tightened more than desired, and the nut is may be difficult to remove with a wrench, and furthermore might be removed only by breaking the rotary tool attached thereby.

3. Purpose of the Invention

The invention relates to a tightening screw comprising a screw member forming female threads or male threads in the shaft core part, a flange ring fitted to the outer periphery of the screw member to contact the object to be tightened, an operating ring for feeding a rotational force by being fitted oppositely to the flange ring on the outer periphery of the screw member, and a torque transmitting member interposed between the screw member and operating ring for transmitting the rotational force of the operating ring to the screw member, wherein the torque transmitting member comprises a reduction mechanism for transmitting the rotational force of the operating ring to the screw member by reducing the speed, and a unidirectional torque limiter for cutting off transmission of torque in the tightening direction of the screw member to the object to be tightened at a specific load.

It is a first object of the invention to provide a tightening screw capable of obtaining a large tightening force or loosening force with a small rotary input, mounting the object securely, tightening or loosening directly by hand, without using a tool, because of the generation of a powerful rotational force increased in torque, and enhancing the attaching and detaching manipulation of the tightening screw.

It is a second object of the invention to provide a tightening screw capable of attaching and detaching the tightening screw quickly without requiring excessive time to attach and detach because the rotary motion of the rotating ring or operating ring is the direct rotary motion of the screw member until the flange ring of the tightening screw abuts against the object to be tightened to fix the rotary motion.

It is a third object of the invention to provide a tightening screw capable of preventing excessive tightening of the tightening screw during rotating of the object to be tightened, by interposing a flange ring for keeping a relative rotary motion between the rotating ring and the object to be tightened, so that the rotating ring does not rotate together with the object to be tightened.

It is a fourth object of the invention to provide a tightening screw capable of distributing uniformly the uneven loads of screw members, rotating the tightening screw smoothly, and tightening with an effective increased torque, by disposing plural screw members uniformly on the circumference around the bolt to be tightened.

It is a fifth object of the invention to to provide a tightening screw which is of a small, compact size without any increased the thickness and with sufficient range of dimensions for the female threads of the screw member for the bolt to be tightened, and wherin the rotating ring and screw member are overlayed inside and out side.

It is a sixth object of the invention to provide a tightening screw capable of increasing the torque significantly by using a large reduction ratio of the difference in the number of teeth between the inner and outer gears or difference in the wave number between the inner and outer cycloid curves, and tightening or loosening the object with this tightening force or loosening force with an increased torque.

It is a seventh object of the invention to provide a tightening screw capable of preventing the screw member from being tightened more than necessary by a rotary tool secured thereby transmitting a tightening force to the screw member, by setting the unidirectional torque limiter at, for example, a force capable of being operated directly by hand, so that excessive tightening may be regulated, and that manual releasing of the screw member may be easy when releasing the tightening screw.

Figure 1:
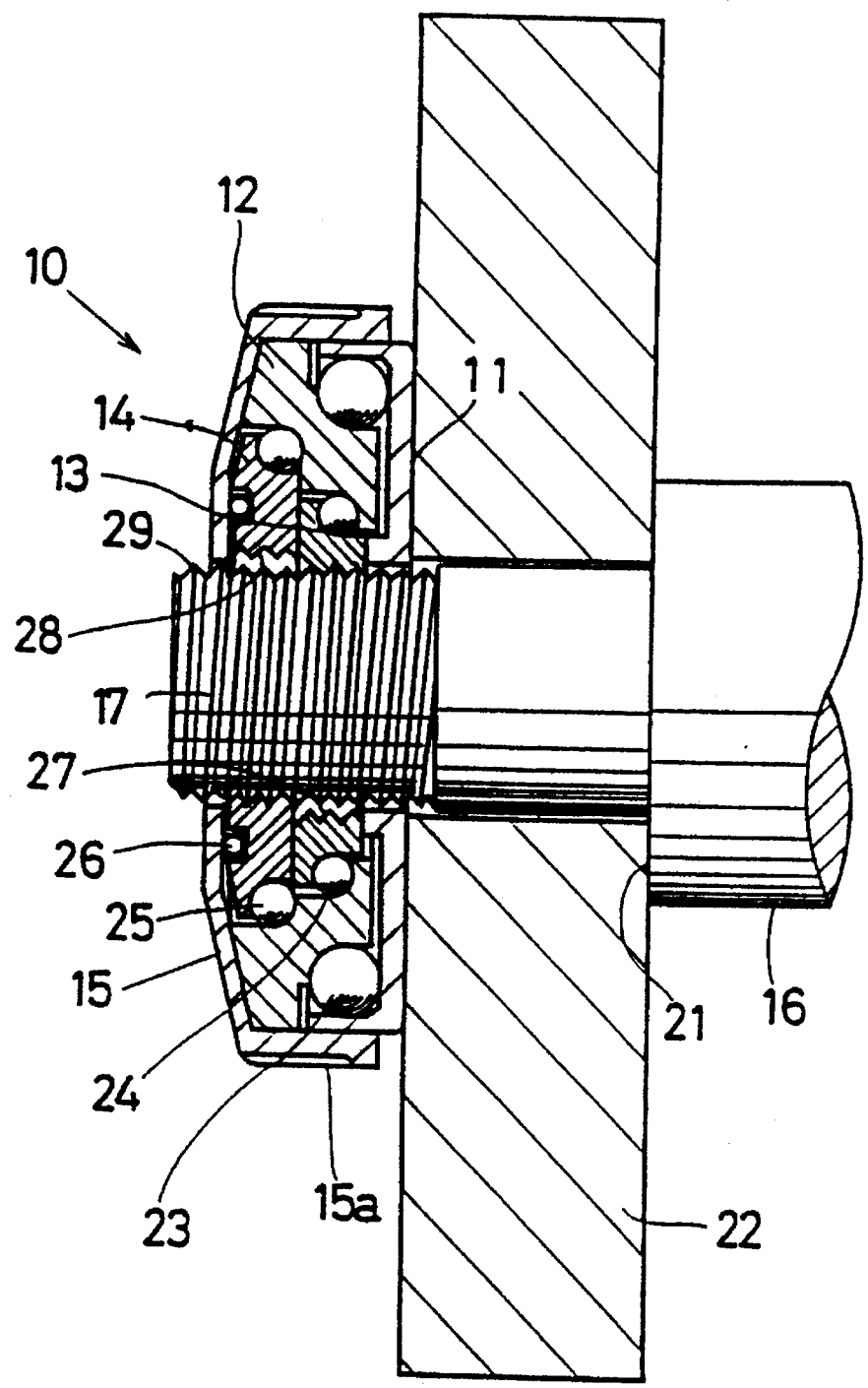
FIG. 1 is a sectional view of a tightening screw.

In general, the tightening screw of the invention operates as follows, taking FIG. 4 as an example. The entire unit 10 is held to gather frictionally by means of holder ring 35 inserted between member 33 and operating ring 31. Unit 10 is screwed onto threads of bolt 37 in the same manner as an ordinary nut, until flange ring contacts object 39. Then, frictional force is applied and the components operate as follows. Because of the eccentric arrangement of operating ring 31 vis-a-vis other components and balls 50 disposed between operating ring 31 and rotating ring 32, force on operating 31 will be transmitted through ball 50 to rotate ring 32. Because the meshed inner gears 45 and outer gears 43, the rotation is then mitted to screw member 33 on a gear ratio basis. In this manner, a smaller amount of manual force can be used to tighten unit 10 about object 39. The gear ratio between the inner and outer gears determines the amount of force needed to tighten the unit about the object. The eccentricity (in FIG. 4, see the opening between operating ring 31 and rotating ring 32 at bottom of cross section) enables tigher fit at one part so that ball 50 will not move, and force is transmitted from operating ring 31 to rotating ring 32, At another part, ball 50 will rotate and no force will be transmitted, such as when no force used since , for example, flange ring 34 is not in contact with object 39. In the foregoing manner, operating ring 31 is turned until screw member 33 attains a desired tightening. The same general principles apply for all embodiments.

DESCRIPTION OF THE PREFERRED EMBODIMENTS

Embodiment 1

An embodiment of the invention is described in detail below with reference to accompanying drawings.

Figure 2:
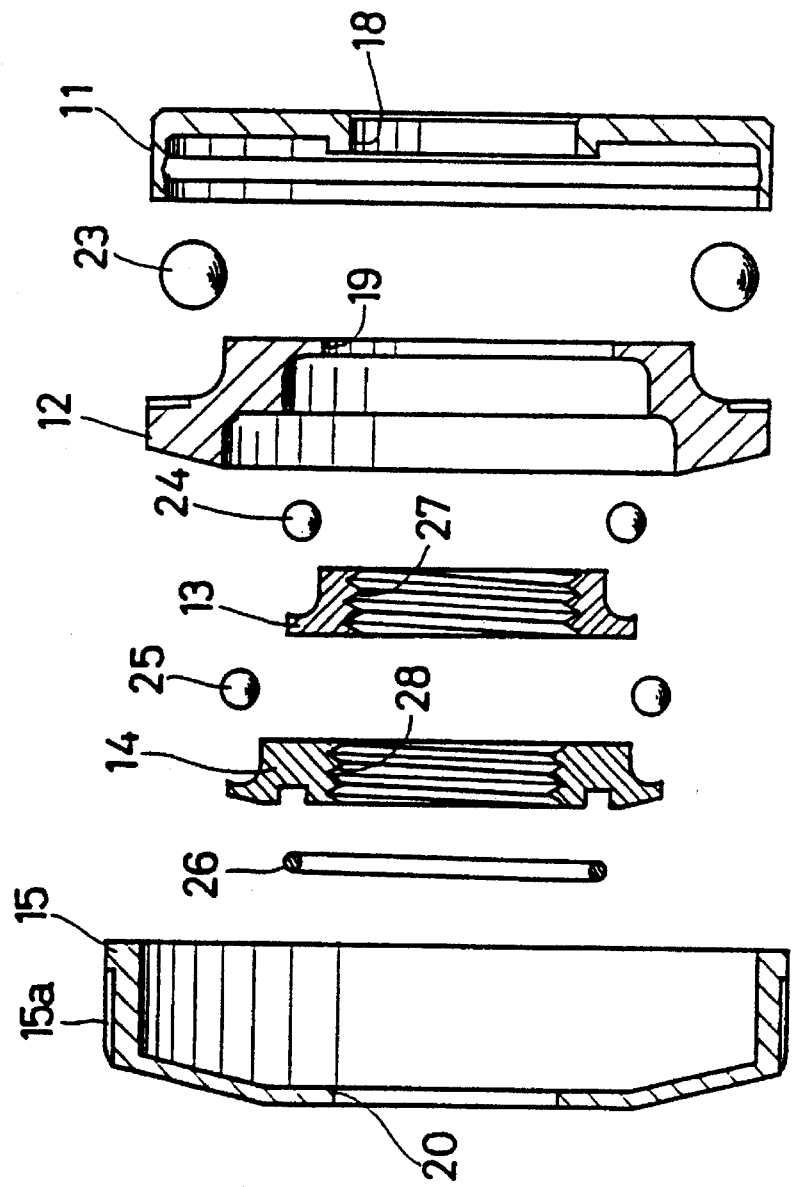
FIG. 2 is an exploded sectional view of a tightening screw

The drawings show a tightening screw, and in FIG. 1 and FIG. 2, the tightening screw 10 is composed of a flange ring 11, a rotating ring 12, screw members of a first nut ring 13 and a second nut ring 14, and an operating ring, and in each central part of the flange ring 11, rotating ring 12 and operating ring 15, for example, insertion holes 18, 19, 20 are formed for inserting mounting bolt 17 of a drive shaft 16 of a power tool such as hand grinder. A flange 21 is formed on the drive shaft 16, and a rotary tool 22 to be tightened, for example, a wheel of a hand grinder is tightened and fixed between the flange 21 and the tightening screw 10 on the mounting bolt 17.

The rotating ring 12 is rotatably held in the flange ring 11 through a bearing 23, and the nut rings 13, 14 are rotatably held in the rotating ring 12 through bearings 24, 25, respectively, and the rotating ring 12 is press-fitted into the operating ring 15, and fixed in one body. On the outer periphery of the operating ring 15, a knurling 15a for rotating is formed. Numeral 26 is an O-ring for sealing the gap.

Figure 3:
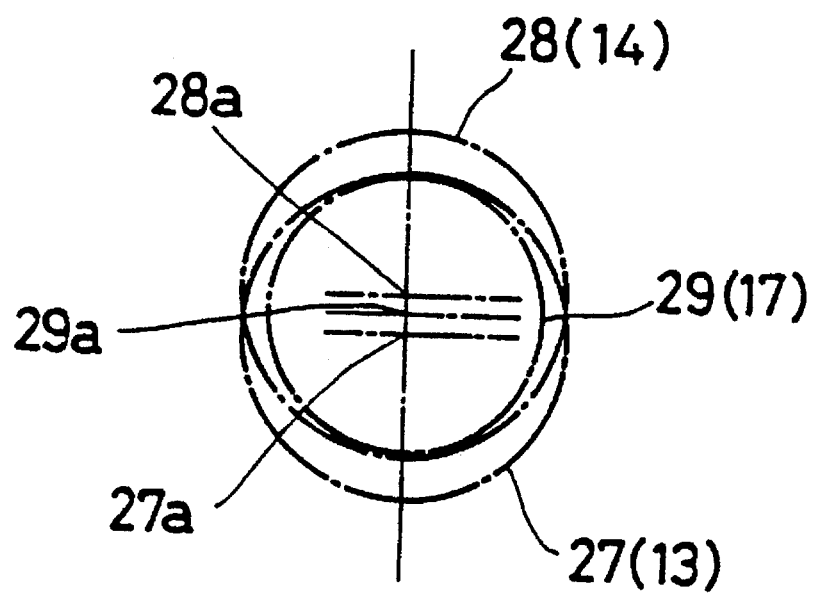
FIG. 3 is an explanatory diagram showing an eccentric state of a nut ring.

Female threads 27, 28 cut with the nut rings 13, 14 are formed in the same pitch as the male threads 29 of the mounting bolts 17, and the screw diameter of the female threads 27, 28 is greater than that of the male threads 29, and the nut rings 13, 14 are held in the rotating ring 12 by eccentricity (i.e. because of the eccentric shapes) so that each part of the female threads 27, 28 may be engaged with the male threads 29 of the mounting bolts 17. The relative eccentric positions of the first nut ring 13 and second nut ring 14 are spaced at an interval of 180 degrees so as to be equally distributed (i.e. So as to not have the larger dimension of one being at the same axial location as the larger dimension of the other) on the circumference of the center 29a of the mounting bolt 17 (male threads 29) as shown in FIG. 3. Meanwhile, FIG. 3 shows the effective diameters of the female threads 27, 28 and male threads 29, and 27a is the center of the female threads 27, 28a is the center of the female threads 28, and these centers 27a, 28a are remote from the center 29a of the male threads 29 by 180 degrees.

By using the thus composed tightening screw 10, in order to mount the rotary tool 22 on the mounting bolt 17 of the drive shaft 16, the operating ring 15 of the tightening screw 10 is directly rotated by manual operation on the male threads 29 of the mounting bolts 17, and the female threads 27, 28 of the both nut rings 13, 14 are screwed in. In this screwing operation, if the flange ring 11 does not contact the rotary tool 22, the operating ring 15, flange ring 11, rotating ring 12, and both nuts 13, 14 are rotated together by the assembling load, and the tightening screw 10 is threaded forward by the engagement between the contact parts of the female threads 27, 28 of the both nut rings 13, 14 and the male threads 29 of the mounting bolt 17.

Successively, when the flange ring 11 abuts against the rotary tool 22, and its rotation is loaded to stop the rotation of the flange ring 11 by this load, the rotary input applied to the rotating ring 12 through the operating ring 15 is applied to both nut rings 13, 14, thereby rotating nut rings 13, 14. The nut rings 13, 14 make rolling motions so that the female threads 27, 28 roll on the periphery of the male threads 29 of the mounting bolt 17, while the nuts 13, 14 revolve by the rolling motion since the female threads 27, 28 are longer than the male threads 29 in peripheral length. The rotation causes slowdown of the screw pitch feed of the rotating ring 12. Thus, the torque increases in the nut rings 13, 14, and by the rotation involving increased torque, the nut rings 13, 14 are screwed to the mounting bolts 17, so that the rotary tool 22 is tightened and fixed to the mounting bolt 17 with the tightening force of the increased torque.

Incidentally, when the two nut rings 13, 14 are uniformly disposed as discussed above, the bias load involving increased torque of the nut rings 13, 14 uniformly acts on the periphery of the mounting bolt 17, so that smooth tightening is achieved.

The torque increase rate of the nut rings 13, 14 is greater as the screw diameter having the greater diameter of the female threads 27, 28 approaches the screw diameter of the male threads 29 having the smaller diameter of the mounting bolt 17, and becomes smaller when the screw diameters diverge. In other words, the torque increase rate is higher as the peripheral length of the female threads 27, 28 is closer to the peripheral length of the male threads 29.

When loosening the tightening screw, since the rotation is already blocked as the flange ring 11 hits against the object such as the rotary tool 22, the nut rings 13, 14 are in rotating state, and as the rotary operation of the rotating ring 12 in the loosening direction revolves the nut rings 13, 14, the nut rings 13, 14 are rotated in the loosening direction with the same increased torque force as discussed above.

Consequently, as the nut rings 13, 14 are loosened, and the flange ring 11 is departed from the object such as the rotary goal until this rotation is permitted, the entire tightening screw 10 rotates as one body, and the rotation of the rotating ring 12 becomes the rotation of the nut rings 13, 14, so that loosening is accelerated.

In this embodiment, two nut rings 13, 14 are used, but it is possible to use only one, or three or more, and when using a plurality of nut rings, it is desired to distribute the engaging positions uniformly so as to apply uniform loads to the bolts to be tightened. In the embodiment, the tightening screw 10 is rotated by hand, but a wrench or other power tool may be also used. In this case, it is possible to tighten with less effort.

Embodiment 2

A second embodiment of the invention is described below with reference to drawings.

Figure 4:
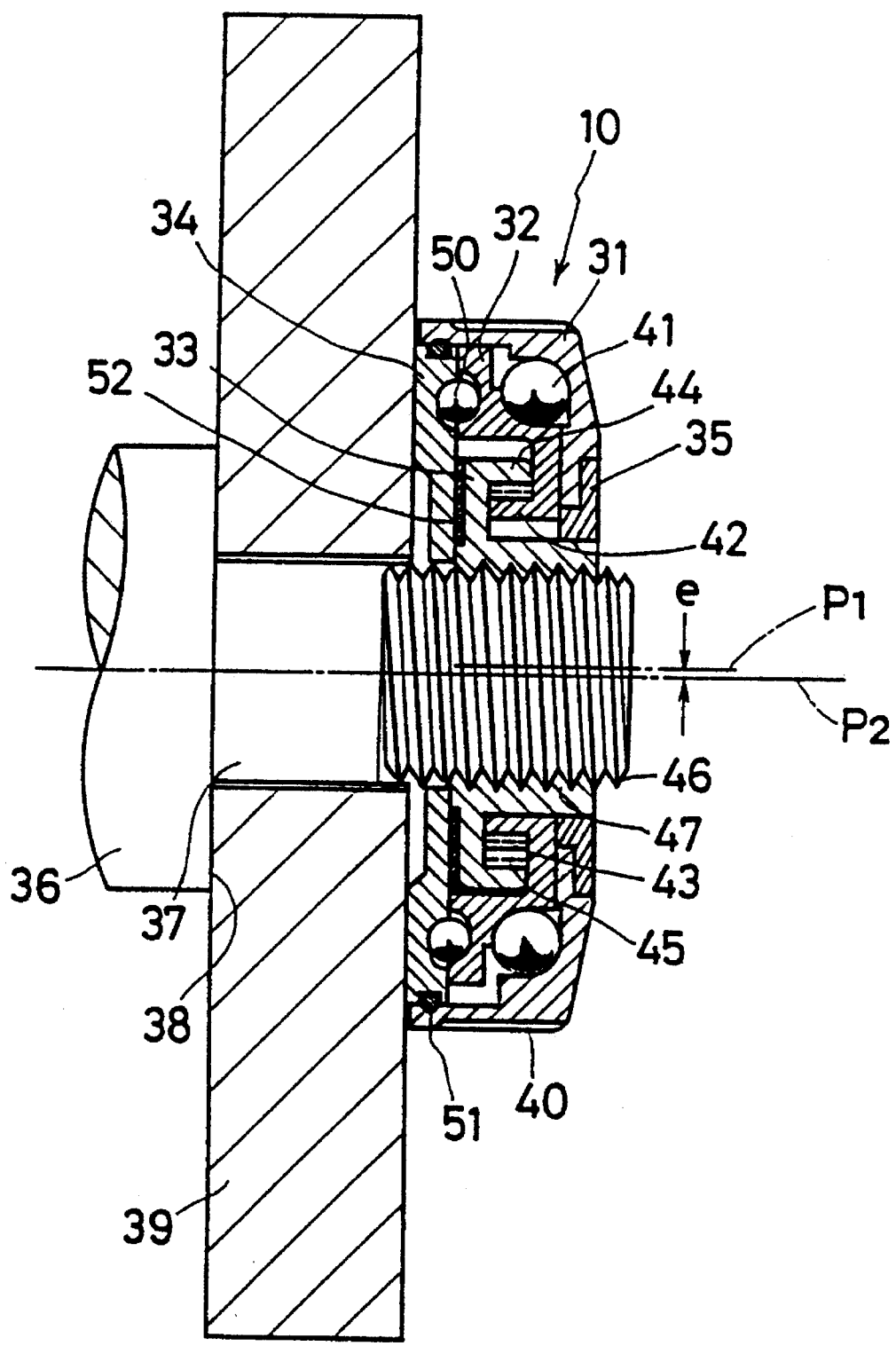
FIG. 4 is a sectional view of a tightening screw in embodiment 2.
Figure 5:
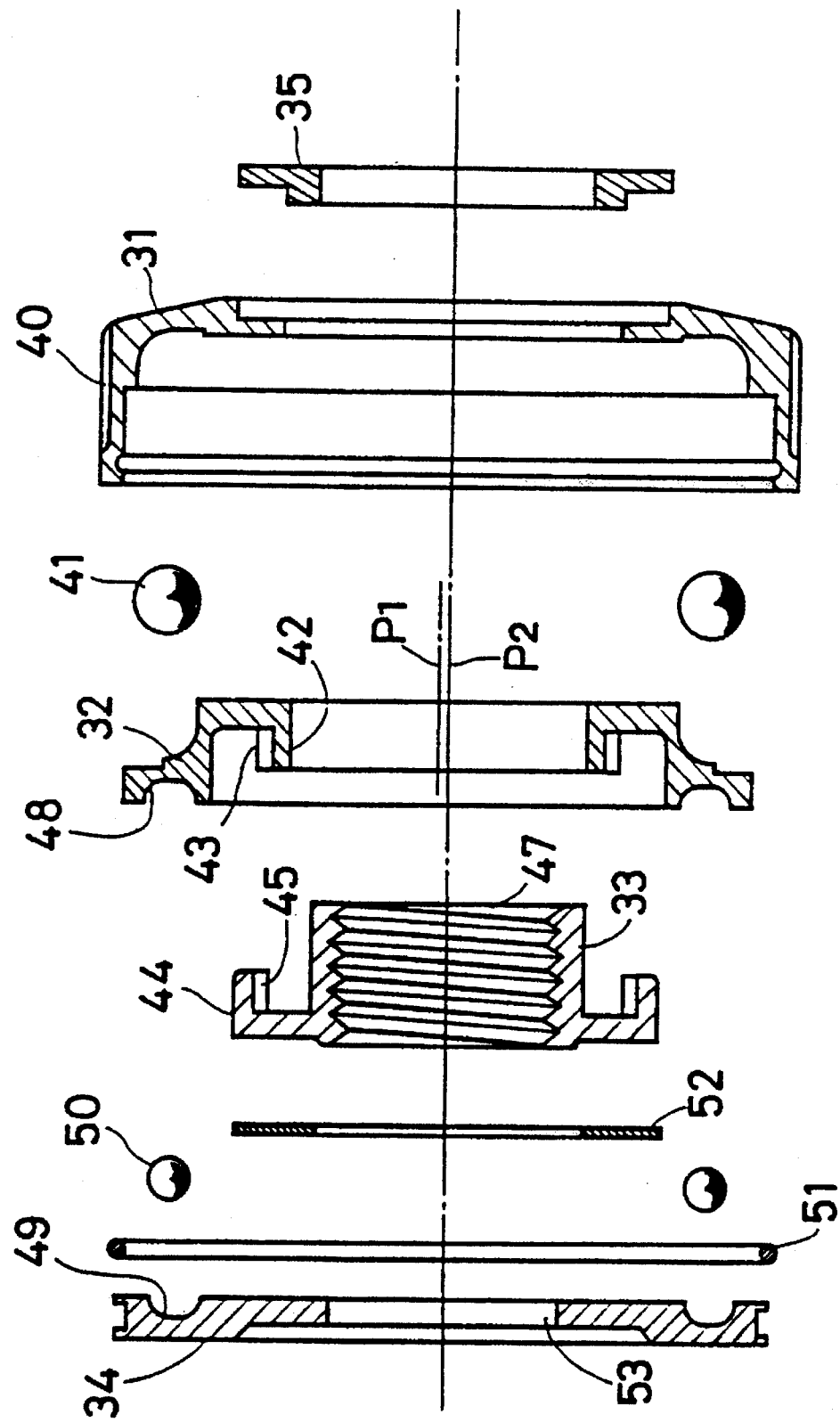
FIG. 5 is an exploded sectional view of the tightening screw shown in FIG. 4.

The drawings show a tightening screw 10, and in FIG. 4 and FIG. 5, the tightening screw 10 comprising an operating ring 31, a rotating ring 32, a screw member 33, a flange ring 34, and a holding ring 35. The tightening screw 10 is screwed to a mounting bolt 37 of a drive shaft 36, and tightens and fixes a rotary tool 39, for example, a wheel of a hand grinder, against a flange 38 formed on the drive shaft 36.

The operating ring 31 serves also as a housing, and opens in the central part in a pi-section, and a knurling 40 is cut in the outer periphery to received manual rotary force, while a bearing 41 is provided in the inner periphery to rotatably hold the rotating ring 32, and the center of rotation P1 of the rotating ring 32 is eccentrically held at an eccentricity e (see FIG. 4) to the center of rotation P2 of the operating ring 31.

A tube 42 is formed in the shaft core part of the rotating ring 32, and an outer gear 43 is formed on the outer periphery of the tube 42, and the number of teeth of this outer gear 43 is defined at 38.

The screw member 33 has a tube 44 formed on its outer periphery, and the inner periphery of the tube 44 has an inner gear 45 having 40 teeth with a difference of 2 teeth from the number of teeth of the outer gear 43 of the rotating ring 32, and this inner gear 45 is partially engaged with the outer gear 43, and the rotating ring 32 and screw member 33 are overlaid inside and outside. Female threads 47 are cut in the shaft core part of the screw member 33, and are engaged with male threads 46 of the mounting bolt 37.

Figure 6:
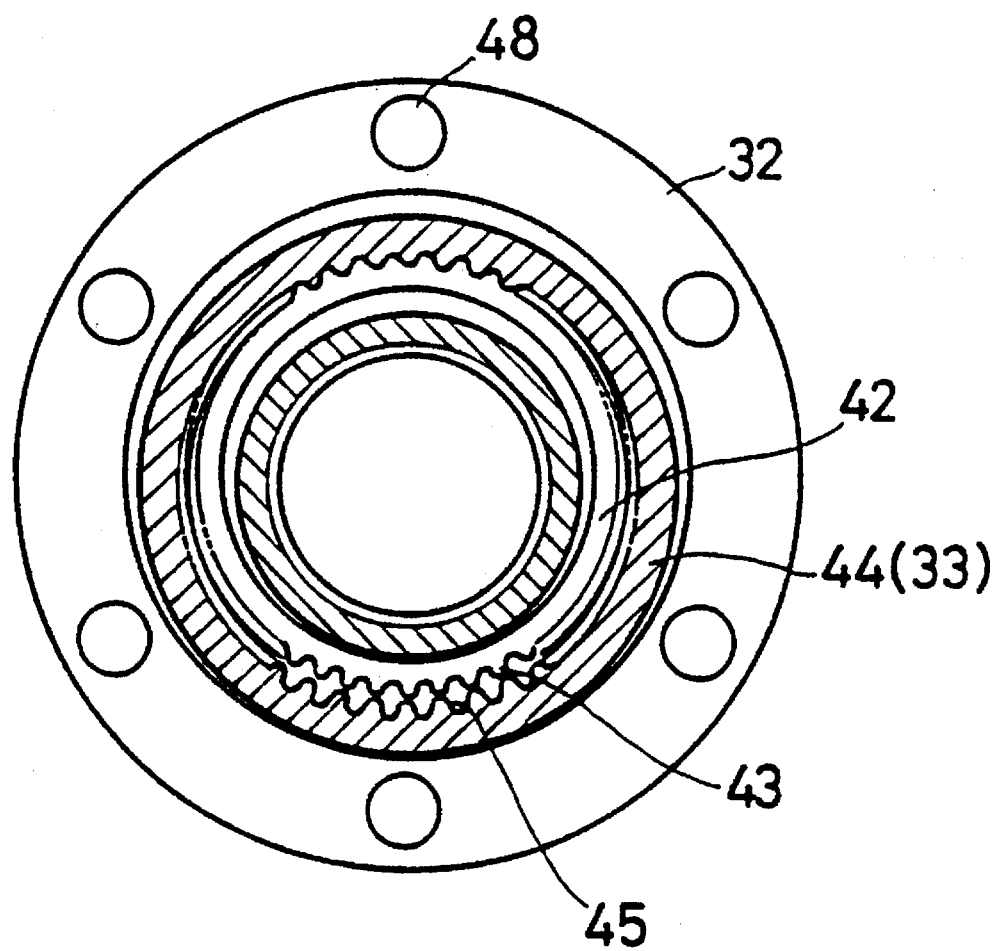
FIG. 6 is a plan view of a rotating ring shown in Fig. 4.

The central part of the flange ring 34 penetrates through an insertion hole 53 of the mounting bolt 37. In the mutually confronting sides of the flange ring 34 and the rotating ring 32 (see FIG. 6), are a ball 50 and engaging recess parts 48,49 which are engaged by regulating the revolution and permitting the rotation of the rotating ring 32. The flange ring 34 is held with its outer periphery rotatable relative to the operating ring 31 through an O-ring 51.

In the confronting surfaces of the flange ring 34 and screw member 33, a thrust washer 52 is inserted, and the side surface of the flange ring 34 is projected slightly outward from the end surface of the operating ring 31.

The holding ring 35 is press-fitted into the outer periphery of the end of screw member 33, and bears the operating ring 31, and also prevents the operating ring 31 and rotating ring 32 from slipping out.

To mount the rotary tool 39 on the mounting bolt 37 of the drive shaft 36 by the thus composed tightening screw 10, the flange ring 34 side of the tightening screw 10 is set opposite to the rotary tool 39, and the female threads 47 of the screw member 33 of the tightening screw 10 are engaged with the male threads 46 of the mounting bolt 37, and the knurled 40 part of the operating ring 31 is directly rotated by hand, thereby engaging the male threads 46 and female threads 47.

At the time of screwing, if the flange ring 34 is not in contact with the rotary tool 39, the operating ring 31, rotating ring 32, screw member 33, and flange ring 34 are rotated together by the assembling load, and the rotation of the operating ring 31 directly becomes the rotation of the screw member 33, so that the tightening screw 10 is rotated.

When the flange ring 34 abuts against the rotary tool 39 and its rotation is loaded to stop the rotation of the flange ring 34 with the load, the rotation of rotating ring 32 is stopped by the engagement between the engaging recesses 48, 49 with the flange ring 34 and the ball 50, and only rotation of tool 39 is permitted. The rotation of the operating ring 31 causes rotation of the rotating ring 32. This rotation causes to rotate the screw member 33, due to the difference in the number of teeth between the outer gear 43 of the rotating ring 32 and the inner gear 45 of the screw member 33 (this rotating direction is same as the rotating direction of the operating ring 31), the number of rotations is reduced in proportion to the ratio of the number of teeth in the outer gear 43 and inner gear 45. By reducing the number of rotations, there is proportional increase in the torque applied to the bolt. Accordingly, screw member 33 is engaged with the bolt 37 to be tightened at an increased torque force and reduced number of rotations tightened and fixed to the flange 38 of the bolt 37 to be mounted with a large tightening force of increased torque. When the tightening screw arrangement 10 is loosened (i.e. turned counterclockwise) so that rotary tool 39 is or will be loosened from contact with flange 38 of drive shaft 36, the following occurs. Operating ring 31 is turned by grasping knurls 40. Rotating ring 32 is tightly fitted to operating ring 31 with balls 41 therebetween, with screw member 33 fitted eccentrically so that teeth 43 of ring 32 will engage 45 of screw member 33 non-continuously. This rotates to the left ring 31, causing rotation of rings 32 and 33.

The foregoing combination is fitted together to flange ring 34 with "O" ring 52 between ring 33 and ring 34 and balls 50 disposed in the holder created by holes 48 and 49 with plug 35. "O" ring 51 is fitted into the peripheral channel of ring 34 and acts as a seal. All of the foregoing elements are fitted together by friction fitting, and substantially locked together, so that counterclockwise movement causes the entire arrangement to rotate together.

When the tightening screw arrangement 10 is abutted against tool 39, and it is desired to tighten tool 39 against flange 38 of shaft 36, the following occurs. The arrangement is fitted together frictionally, and when ring 31 is turned clockwise, tightening force is applied by the tool arrangement 10 to tool 39. Because the inner ring 43 is smaller in number than the outer teeth 45, the outer ring and ring 32 turn a greater rotary distance than does ring 33, so that a larger torque force (which is proportional to the ratio of the number of teeth in the inner and outer teeth) is brought to gear. Thus, with a small manual rotary force, such as applied by hand to the knurl of ring 31, the ring 33 will tighten around thread whereby locking and tightening is accomplished. There is slight eccentricity (see axis P1,P2 of FIG. 5, and distance "e" in FIG. Thus, as the ring 31 is turned, the eccentricity of the ring 32, and hence 33, causes the thread 47 to be engaged with thread 46, and the non-continuous engagement of the two sets of teeth 44,45 so that the outer ring 31 can be turned a greater number of rotations than the number of rotations applied to the threads 47,46. and the rotary tool 39 as the object of tightening is Incidentally, the reduced number of rotation of the screw member to the operating ring 31 is (number of teeth of inner gear 45-number of teeth of outer gear 43)/number of teeth of outer gear 43, and in this embodiment, the proportional change in the reduction of number of rotations is obtained as follows $$(40\text{teeth} - 38\text{teeth})/38\text{teeth} = 2/38 = 1/19$$

When loosening the tightening screw 10, since the flange ring 34 is already hitting against the rotary tool 39 and its rotation is arrested, the rotating ring 32 is in a rotatable state. Therefore as the rotating motion of the operating ring 31 in the loosening direction rotates the rotating ring 32, the screw member 33 is rotated by a rotational force of increased torque same as before, so that the arrangement is loosened.

As the screw member 33 is loosened, and the flange ring 34 is spaced apart from the rotary tool 39, and its rotation is permitted, the entire tightening screw 10 is rotated as one body, and the rotation of the operating ring 31 directly becomes the rotation of the screw member 33, thereby making it possible to loosen the arrangement quickly.

In embodiment 2, the tightening screw 10 is rotated manually, but a wrench or other power tool may be used. In this case, it is possible to operate to tighten and loosen with less effort. The tightening screw of the invention is realized by forming female threads 47 in the screw member 33, so that it may be used as a nut.

Although the screw member 33 in embodiment 2 is used as a nut by forming female threads 17, it may be also used as a bolt by forming male threads in the screw member 33.

Embodiment 3

A third embodiment of the invention is described in detail below with reference to the drawings.

Figure 7:
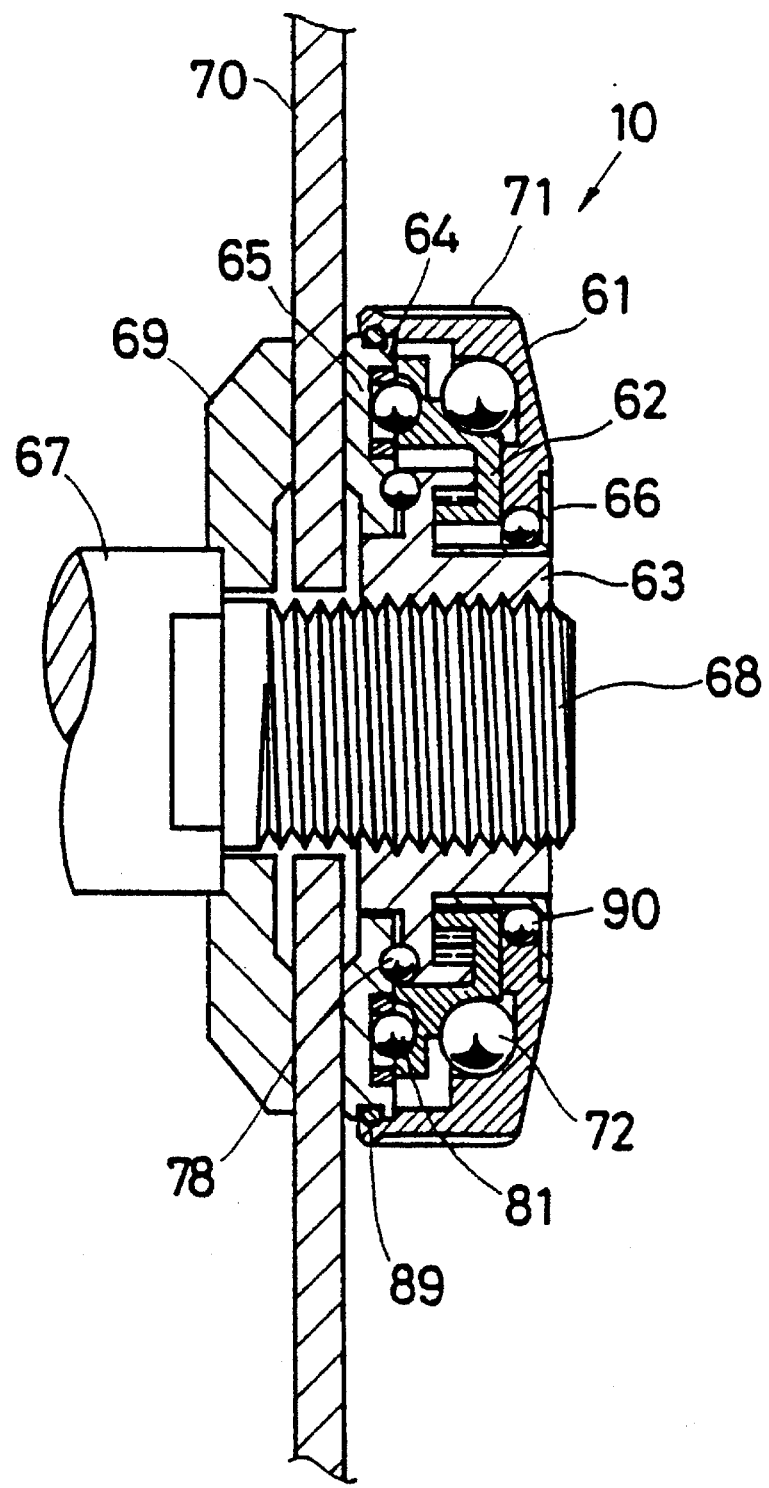
FIG. 7 is a longitudinal sectional view of a tightening screw in embodiment 3.
Figure 8:
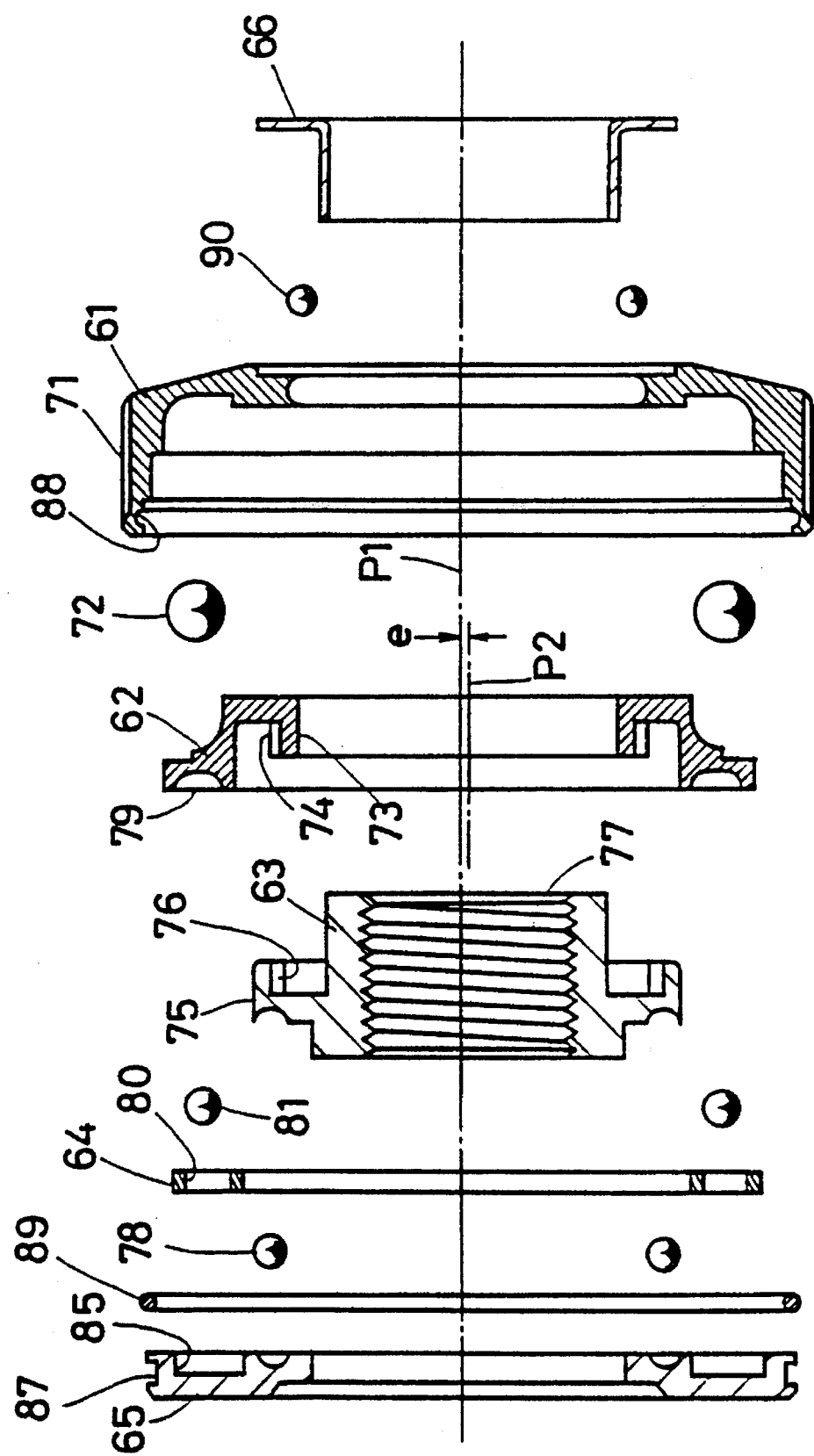
FIG. 8 is an exploded longitudinal sectional view of the tightening screw shown in FIG. 7.

The embodiment relates to a tightening screw having a function of preventing excessive tightening through a torque limiter installed at the tightening side, and in FIG. 7 and FIG. 8, the tightening screw 10 comprises an operating ring 61, a rotating ring 62, a ring-shaped screw member 63, a ring-shaped sliding member 64, a flange ring 65, and a holding ring 66. This tightening screw 10 is screwed to a mounting bolt 68 of a drive shaft 67, and tightens and fixes a rotary tool 70, for example, the wheel of a hand grinder, together with an inner flange 69 mounted on the drive shaft 67.

The operating ring 61 is a ring in a pi-section, opening in the central part, and a knurling 71 is cut in the outer periphery to receive a manual rotary force, and the rotating ring 62 is rotatably held through a bearing 72 in the inner periphery. The center of rotation P1 of the rotating ring 62 is held eccentric at an eccentricity e to the center of rotation P2 of the operating ring 61.

Figure 9:
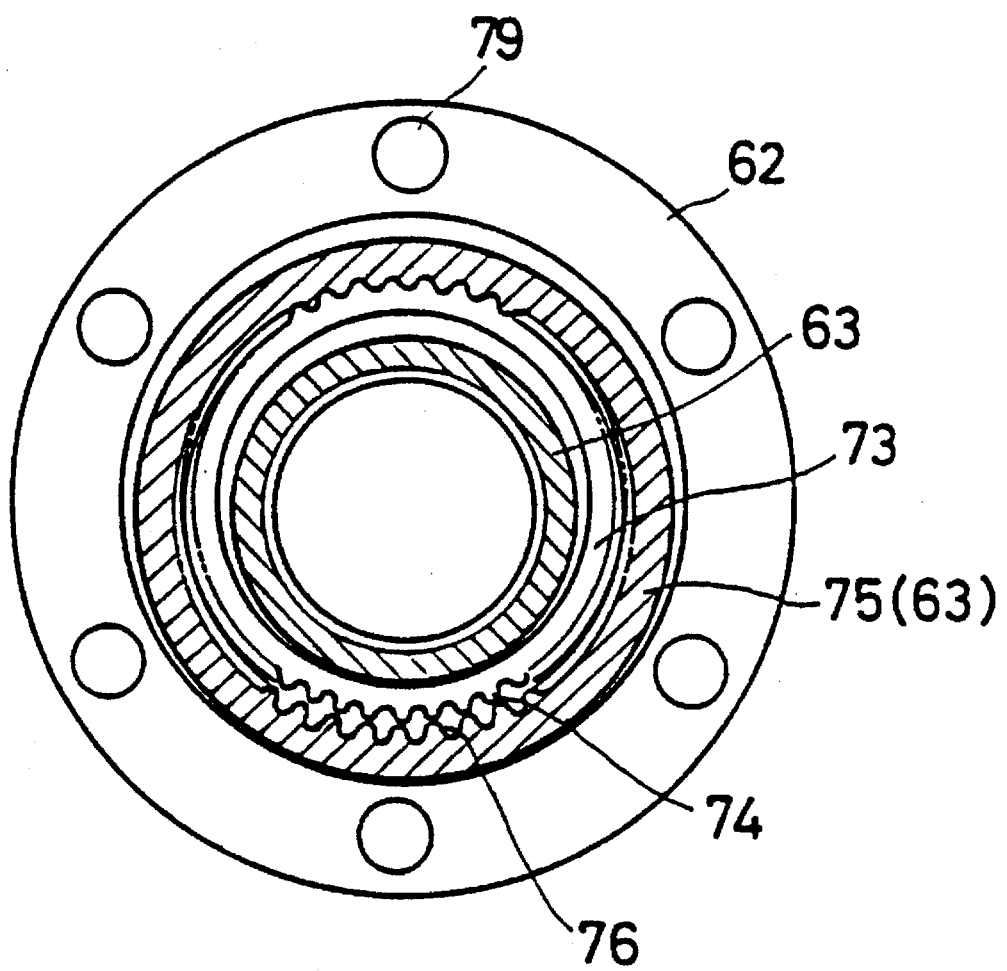
FIG. 9 is a sectional view showing the left side of the rotating ring and the engaging parts of the inner gear and outer gear.

As shown in FIG. 9, a tube 73 is formed on the shaft core-part of the rotating ring 62, and an outer gear 74 is formed on the outer periphery of the tube 73, and the number of teeth of this outer gear 74 is 38.

On the screw member 63, a tube 75 is formed on its outer periphery, and the inner periphery of this tube 75 has an inner gear 76 of which the number of teeth is 40, with a difference in the number of teeth of 2 from the outer gear 74 of the rotating ring 62. The inner gear 76 is partially engaged with the outer gear 74, and the rotating ring 62 and screw member 63 are overlaid inside and outside.

In the shaft core part of the screw member 63, female threads 77 are cut so as to be engaged with the mounting bolt 68.

The middle opening part of the flange ring 65 is freely held on the outer periphery of the screw member 63, and bearings 78 are placed at the mutually opposing sides. In the mutually confronting parts of the flange ring 65 and the rotating ring 62 (see FIG. 8), the engaging means for regulating the revolution of the rotating ring 62 and permitting its rotation is formed. The engaging means comprises an engaging recess 79 formed in the rotating ring 62, engaging recess 80 formed in the sliding member 64, and a ball 81 to be engaged therewith. Such engaging means is formed at six positions.

Figure 10:
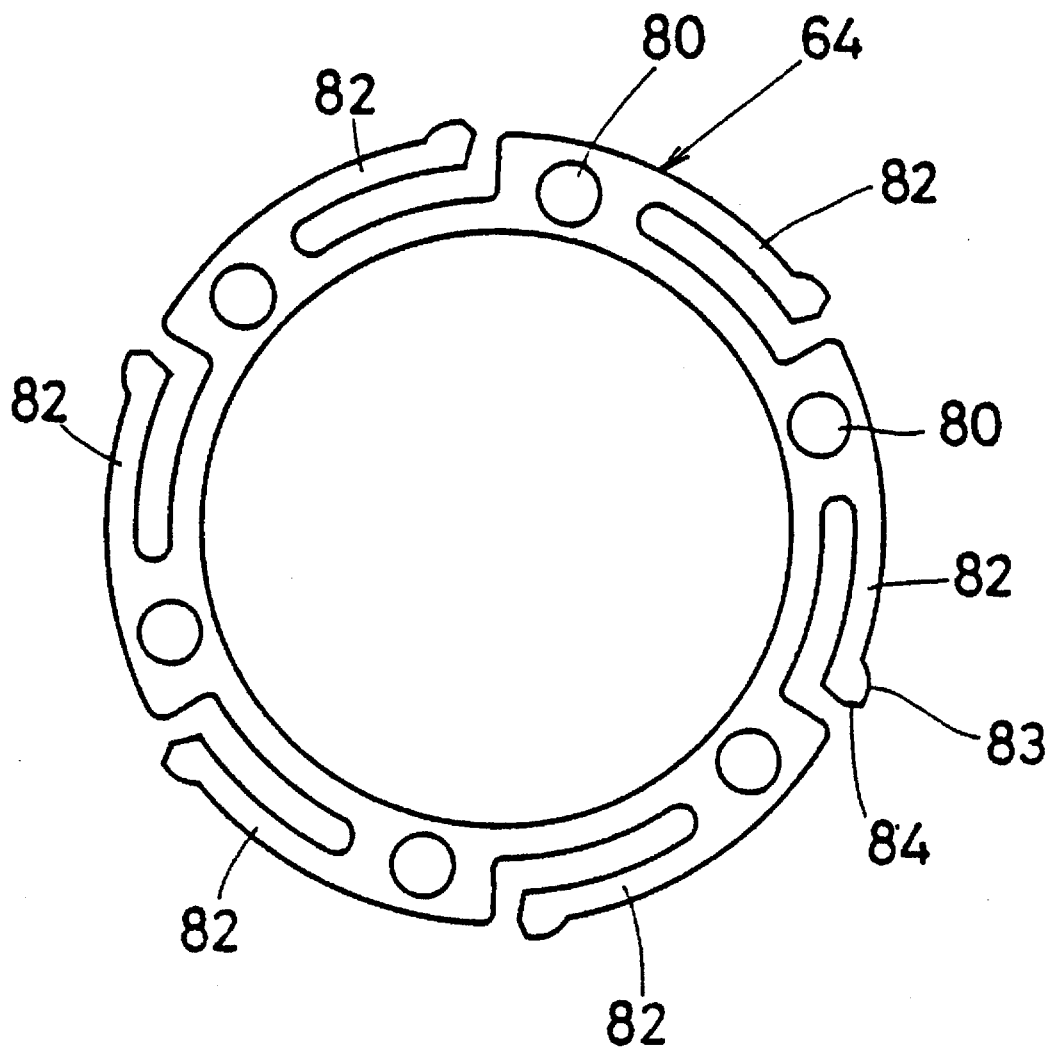
FIG. 10 is a right side view of a sliding member.

The sliding member 64 forms a unidirectional torque limiter together with the flange ring 65 as shown in FIG. 10, slider member 64 is formed of six elastic parts 82 by cutting in at six equal divisions on the periphery. A sliding surface 83 is formed at the side corresponding to the tightening direction of the screw member 63 of the outer periphery of the free end of each elastic part 82. A defining surface 84 is formed at the side corresponding to the releasing direction. The elastic force of the elastic parts 82 is set by the thickness and cutting depth of the corresponding parts 82.

Figure 11:
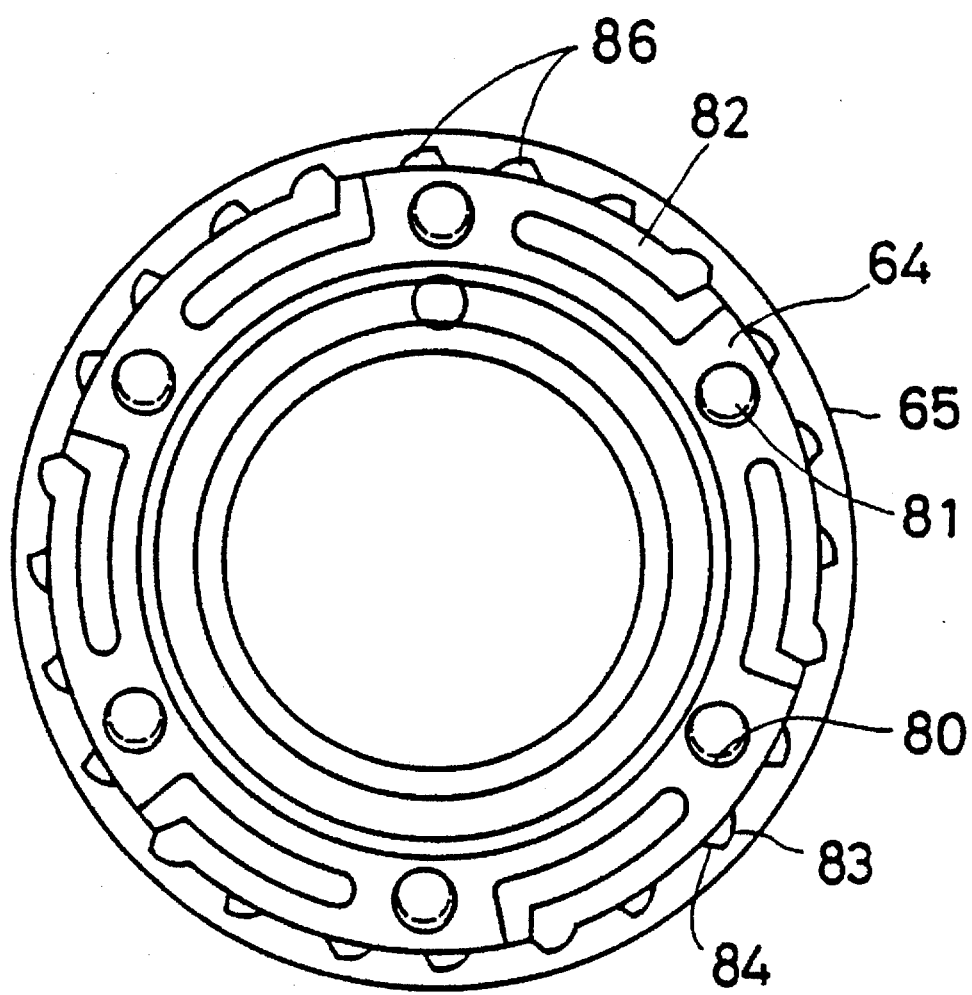
FIG. 11 is a right side view showing the state of mounting a sliding member on a flange ring.

The sliding member 64 is fitted into a groove 85 formed in the inner periphery at the inside of the flange ring as shown in FIG. 8. Moreover as shown in FIG. 11, a multiplicity (24, in this embodiment) of engaging recesses 86 are formed corresponding to the sliding surface 83 and defining surface 84 of the elastic parts of the sliding member 64 on the inner surface of the groove 85. When the tightening load acts on the engaging recess 80 of the sliding member 64 through the ball 81 in the engaged state of the sliding surface 83 and defining surface 84 of the elastic parts 82 and the engaging recess 86 and the load exceeds a preset value, the elastic parts 82 are deformed elastically, and the sliding surface 83 and the engaging recess 86 are dislocated, and the sliding member 64 idles in the groove 85 of the flange ring 65.

Returning to FIG. 7 and FIG. 8, the outer periphery of the flange ring 65 is overlaid with the inner periphery of the end of the operating ring 61, and grooves 87, 88 are formed in the confronting sides, and stopping rings 89 are provided in these grooves 87, 88. The stopping rings 89 may be O-rings for sealing purpose.

The holding ring 66 is press-fitted to the end outer periphery of the screw member 63, and the operating ring 61 is borne through a bearing 90, thereby preventing the operating ring 61 from slipping out.

Using the thus composed tightening screw 10, to mount the rotary tool 70 on the mounting bolt 68 of the drive shaft 67, the flange ring side 65 of the tightening screw 10 is set against the rotary tool 70, and the female threads 77 of the screw member 63 of the tightening screw 10 are matched with the mounting bolt 68, and the knurling 71 of the operating ring 61 is directly rotated by hand to screw in the female threads 77.

When the arrangement is being turned, if the flange ring 65 is not in contact with the rotary tool 70, the operating ring 61, rotating ring 62, screw member 63, and flange ring 65 are rotated together by the assembling load, and the rotation of the operating ring 61 directly becomes the rotation of the screw member 63, so that the tightening screw 10 rotated.

When the flange ring 65 abuts against the rotary tool 70 load is applied to stop the rotation of the flange ring 65 and rotation of the rotating ring 62 is stopped by the engagement between the engaging recesses 79, 80 with the flange ring 65 and the ball 81. The rotation of the operating ring 61 causes rotation of the rotating ring 62. The rotation causes rotation of the screw member 63 by the portion of the difference in the number of teeth, due to the difference in the number of teeth between the outer gear 74 of the rotating ring 62 and the inner gear 76 of the screw member 63 (this rotating direction is same as the rotating direction of the operating ring 61). This rotation becomes the rotation of the proportionally reduced number rotation of the operating ring 61, that is, the reduced rotation number, and this reduction in rotation number becomes a great torque increase. The screw member 63 is engaged with the bolt 68 to be tightened by increased torque and reduced rotation number, and the rotary tool 70 as the object of tightening is tightened and fixed to the inner flange 69 with a large tightening force of increased torque.

Incidentally, the reduced number of rotations of the screw member 63 the operating ring 61 is (number of teeth of inner gear 76−number of teeth of outer gear 74)/number of teeth of outer gear 74, and in this embodiment, the number of rotations is obtained as follows (40 teeth−38teeth)/38teeth=$2/38=1/19$ When the tightening force of the tightening screw 10 reaches a preset value, that is, the action force set in the elastic parts 82 (see FIG. 10, 11) of the sliding member 64, the elastic parts 82 are deformed elastically, and the sliding surface 83 is dislocated from the engaging recess 86 of the flange ring 65, and the sliding member 64 rotates (idles) in the groove 85 of the flange ring 65, so that the rotating ring 62 is deprived of its rotation and only revolves, while the outer gear 74 rotates about the circumference of the inner gear 76 of the screw member 63, thereby cutting off torque transmission.

Therefore, if the operating ring 61 is rotated in the tightening direction, the screw member 63 will not be tightened.

Thus, tightening and using the rotary tool 70, when the rotary tool 70 is used and force is transmitted to the tightening screw 10, if rotational force in the tightening direction acts on the operating ring 61 by such transmitted force, since the torque transmission is cut off as mentioned above, the screw member 63 will not be tightened further by this rotational force.

When loosening the tightening screw 10, since the flange ring 65 is already abutting against the rotary tool 70 and its rotation has been arrested, the rotating ring 62 is in a rotating state, and the rotating operation of the operating ring 61 in the loosening direction (canceling direction) will cause the rotating ring 62 to rotate, and with a large force of increased torque in the same manner as above the screw member 63 is, so that the tightening may be loosened.

Moreover, the rotation in the loosening direction above is defined so as not to displace the elastic parts 82 as the defining surface 84 of the elastic parts 82 of the sliding member 64 acts on the engaging recess 86 of the flange ring 65. Therefore the torque limiter is in an inactive state, and it is possible to loosen the arrangement by using acting a greater force than in tightening.

Successively, when the screw member 63 is loosened and the flange ring 65 is spaced from the rotary tool 70 and its rotation is permitted, the entire tightening screw 10 rotates as one body, and the rotation of the operating ring 61 becomes directly the rotation of the screw member 63, thereby loosening quickly.

In embodiment 3, the tightening screw 10 is rotated by hand, but a wrench or power tool may be used. In such a case, it is possible to operate to tighten and loosen with less effort.

Embodiment 4

The tightening screw 10 shown in FIG. 7 is in a nut form, but it may be also a bolt form. That is, as in embodiment 4 shown in FIG. 12 wherein, male threads 92 are formed on one side of the screw member 63 of the tightening screw 10, while a hexagonal hole 93 for inserting a hexagonal wrench is formed on the other side.

Figure 12:
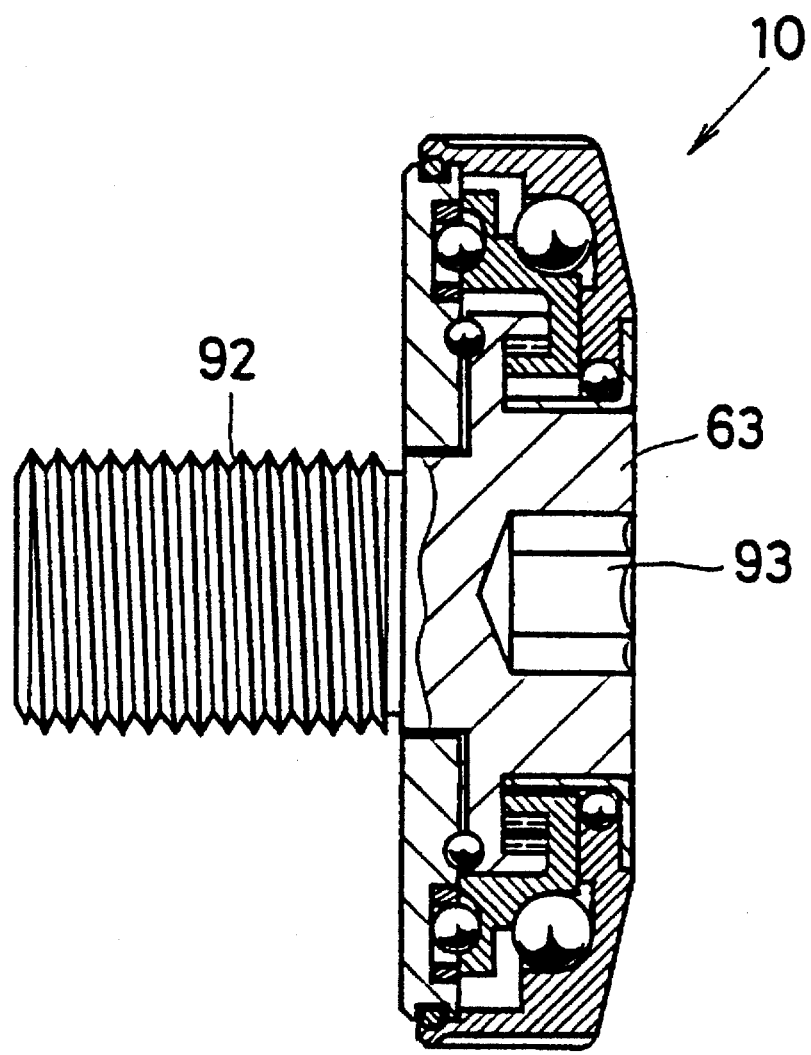
FIG. 12 is a longitudinal sectional view of a bolt type tightening screw in embodiment 4.

In FIG. 12, the other construction details are same as the tightening screw 10 of embodiment 3 shown in FIGS. 7 to 11, and detailed description therefore is omitted, and in the case of bolt form, too, the same action and effect as in the tightening screw 10 in embodiment 3 may be obtained.

The torque transmission member in the tightening screw 10 of the embodiment 3 was composed of outer gear 74 of rotating ring 62, inner gear 76 of screw member 63, engaging recesses 79, 80 by rotating ring 62 and sliding member 64, and ball 81. The torque transmission member formed a differential rotation number reduction mechanism and produced a torque increase when a unidirectional torque limiter is formed without using torque increase function, the rotating ring 62 is omitted, and confronting sides are formed between the operating ring 61 and screw member 63, and the unidirectional torque limiter by sliding member 64 may be disposed between these confronting sides. Or the sliding member 64 may be provided at the rotating ring 62 side.

Embodiment 5

Figure 13:
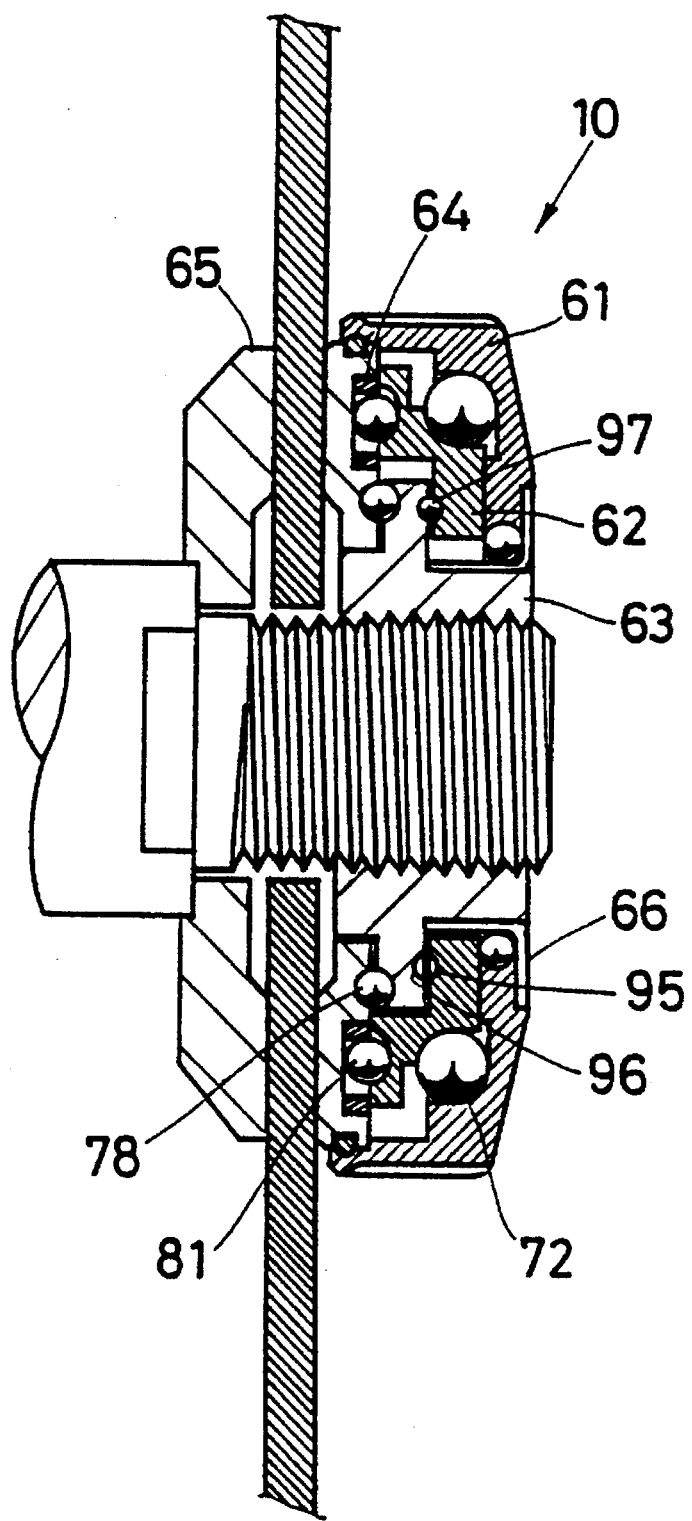
FIG. 13 is a longitudinal sectional view of a tightening screw showing other example of differential reduction mechanism in embodiment 5.
Figure 14:
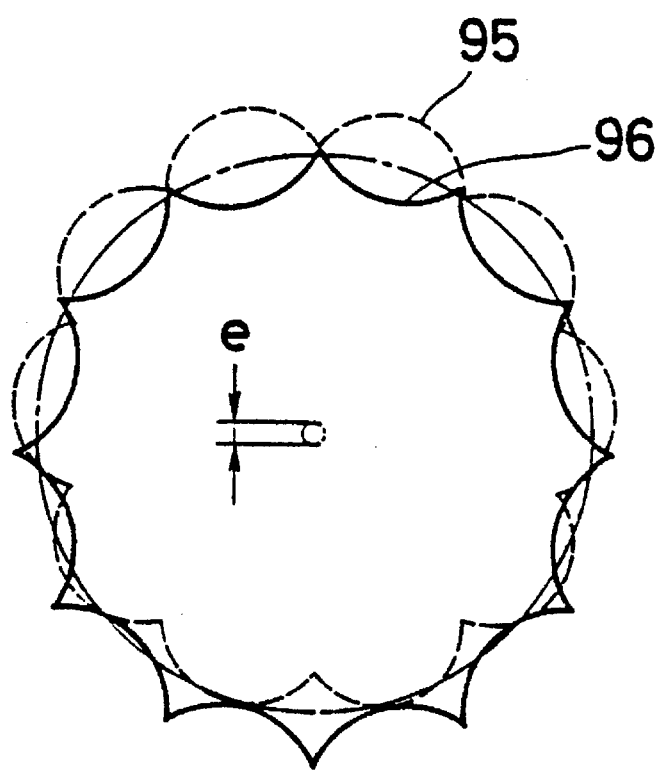
FIG. 14 is an explanatory diagram of a rolling groove.

Moreover, as another example of differential rotation number reduction mechanism as a torque transmission member of the embodiment 3, the tightening screw 10 of embodiment 5 may be formed as shown in FIG. 13. In the case of this tightening screw 10, except for the rolling groove 49 of rotating ring 62 and rolling groove 96 of screw member 63 formed on the confronting surfaces, and ball 97 interposed between them, the construction is same as in the tightening screw 10 shown in FIGS. 7 to 11, and detailed description thereof is omitted.

That is, as shown also in FIG. 13, a rolling groove 95 is cut in the rotating ring 62 side in a circular section by epicycloid curve, while a rolling groove 96 is cut in the screw member 63 side in a circular section by hypocycloid curve, and multiple balls 97 are held between these rolling grooves 95 and 96 so as to be free to roll.

The amplitude of the rolling grooves 95, 96 is set same as the eccentricity e of the rotating ring 62, and the wave number of the rolling groove 95 at the rotating ring 62 side cut in 10 waves, while the wave number of the rolling groove 96 at the screw member 63 side is cut in 12 waves, and the number of the balls 97 held between the rolling grooves 95 and 96 is set at 11 or less.

By thus forming the screw arrangement, when the rotating ring 62 is rotated by the rotation of the operating ring 61, the balls 97 roll along the rolling grooves 95,96, and the screw member 63 revolve by itself, and this revolution is slowed down as compared with the rotation, so that the slowed output causes a large torque increased output.

In the case of embodiment 5, the wave number of the rolling groove 95 of the rotating ring 61 is 10 waves, and the wave number of the rolling groove 96 of the screw member 63 is 12 waves, and the difference in wave number is 2 waves, the speed reduction rate is 2waves/10waves=$1/5$ and hence a large rotation number reduction ratio may be obtained by increasing the wave number.

Thus, the torque transmission member is formed by the differential speed reduction mechanism of rolling grooves 95, 96 and balls 97.

What is claimed is:

1. A tightening screw for holding an object on a drive means, said screw comprising:

a screw member comprising a core part with a plurality of threads for engaging said drive means, a circular outer surface portion, and a circular ring portion having a plurality of inwardly directed inner gears, said inner gears being of a first number;

a flange ring comprising an engaging surface and a contacting surface, and being disposed to be next to said screw member and having said contacting surface in contact with said object;

a rotating ring comprising an inner core part disposed to surround said circular outer surface portion of said screw member, and further comprising an intermediate ring portion having a plurality of outwardly directed outer gears non-continuously engaged with said inner gears of said screw member, said inner gears being of a second number different from said first number; and operating ring comprising an inner surface and disposed to cover said rotating ring and rotatably hold eccentrically said rotating ring with said inner surface so that upon rotation of said operating ring, said rotating ring is turned to controllably rotate said screw means through engagement of said inner and outer gears, said operating ring further comprising an end surface which is engaged with said engaging surface of said flange member while defining a revolution and allowing rotation of said rotating ring;

wherein said rotating ring comprises a unidirectional torque limiter for cutting off transmission of torque in a tightening direction as supplied from said operating ring to said object being tightened.

2. The screw of claim 1, wherein said unidirectional torque limiter comprises a sliding member disposed in an engaging part of said flange ring and comprises an elastically deformable material.

3. The screw of claim 1, wherein said unidirectional torque limiter comprises a sliding member disposed in an engaging part of said rotating ring and comprises an elastically deformable material.

4. A tightening screw for holding an object on a drive means, said screw comprising:

a screw member comprising a core part with a plurality of threads for engaging said drive means, and a confronting surface;

a flange ring comprising an engaging surface and a contacting surface and disposed next to said screw member with said contacting surface in contact with said object;

a rotating ring comprising a confronting surface and disposed so that said confronting surface thereof is opposite in an axial direction from said confronting surface of said screw member, and wherein rolling grooves differing in wave numbers are formed in said confronting surfaces by epicycloid and hypocyclid curves;

a plurality of spherical balls disposed within said rolling grooves formed between said confronting surfaces of said rotating ring and said screw member;

wherein said flange ring is disposed to be opposite said rotating ring with said engaging surface thereof being engaged with said engaging surface of said rotating ring so as to define a revolution and allowing rotation of said rotating ring; and an operating ring comprising an inner surface and disposed to cover said rotating ring and rotatably hold eccentrically with said inner surface said rotating ring so that upon rotation of said operating ring said rotating ring is rotated to thereby controllably rotate said screw member through said plurality of spherical balls in said rolling grooves;

wherein said rotating ring comprises a unidirectional torque limiter for cutting off transmission of torque in a tightening direction from said operating ring to said object to be tightened.

* * * * *